United States Patent
Imhof et al.

(10) Patent No.: US 8,527,157 B2
(45) Date of Patent: Sep. 3, 2013

(54) AGRICULTURAL COMBINE AND DRAPER HEADER

(75) Inventors: Crystal Imhof, Zweibrücken (DE); Corwin Marcus Raymond Puryk, East Moline, IL (US)

(73) Assignee: Deere & Company, Moline, IL (US)

( * ) Notice: Subject to any disclaimer, the term of this patent is extended or adjusted under 35 U.S.C. 154(b) by 490 days.

(21) Appl. No.: 12/769,397

(22) Filed: Apr. 28, 2010

(65) Prior Publication Data

US 2011/0270494 A1  Nov. 3, 2011

(51) Int. Cl.
*A01D 75/18* (2006.01)

(52) U.S. Cl.
USPC ........... 701/50; 56/10.2 J; 56/10.3; 340/438; 414/530

(58) Field of Classification Search
USPC ........ 701/50; 340/438–440, 815.4; 414/507, 414/530; 56/10.3
See application file for complete search history.

(56) References Cited

U.S. PATENT DOCUMENTS

| | | | | |
|---|---|---|---|---|
| 4,204,387 A | * | 5/1980 | Eistert et al. | 56/98 |
| 4,306,403 A | * | 12/1981 | Hubbard et al. | 56/10.3 |
| 4,321,991 A | | 3/1982 | Teijido et al. | |
| 4,776,154 A | * | 10/1988 | Weiss et al. | 56/10.2 J |
| 5,855,108 A | * | 1/1999 | Salz et al. | 56/10.2 G |
| 5,978,720 A | * | 11/1999 | Hieronymus et al. | 701/31.4 |
| 6,282,476 B1 | * | 8/2001 | Hieronymus et al. | 701/50 |
| 6,839,616 B2 | * | 1/2005 | Beck | 701/50 |
| 7,452,267 B2 | * | 11/2008 | Bundy et al. | 460/6 |
| 7,478,522 B1 | * | 1/2009 | Lovett et al. | 56/296 |
| 7,520,111 B2 | * | 4/2009 | Berger et al. | 56/10.2 J |
| 7,520,115 B2 | * | 4/2009 | Coers et al. | 56/15.8 |
| 7,658,059 B2 | | 2/2010 | Majkrzak | |
| 7,827,773 B2 | * | 11/2010 | Sauerwein et al. | 56/181 |
| 7,992,372 B1 | * | 8/2011 | Coers et al. | 56/153 |
| 2004/0158381 A1 | * | 8/2004 | Strelioff et al. | 701/50 |
| 2007/0251202 A1 | * | 11/2007 | Coers et al. | 56/181 |

FOREIGN PATENT DOCUMENTS

| | | |
|---|---|---|
| CA | 1243845 | 11/1968 |
| WO | 2009136267 | 11/2009 |

OTHER PUBLICATIONS

European Search Report, Aug. 22, 2011, 7 pgs.

* cited by examiner

*Primary Examiner* — Drew Brown
*Assistant Examiner* — Timothy Wilhelm

(57) ABSTRACT

An agricultural combine with draper header includes left and right conveyors, and a microprocessor-based controller coupled to the conveyors to determine whether one of the conveyors is overloaded or slipping.

4 Claims, 3 Drawing Sheets

AGRICULTURAL COMBINE AND DRAPER HEADER

FIELD OF THE INVENTION

The invention relates to agricultural combines with feederhouses and draper headers configured to be supported on said feederhouses.

BACKGROUND OF THE INVENTION

Agricultural combines are large machines that harvest, thresh, separate and clean agricultural crops that bear grain. The clean grain obtained is stored in a grain tank arranged on the combine. The threshed straw is generally chopped and spread out on the field across the width of the chopping mechanism.

In one common arrangement, the cut crop material from which the grain is extracted is gathered by a laterally extending "header" that rests on a feederhouse which extends forward from the agricultural combine in the direction of travel of the combine as it travels through the field harvesting crop. The header extends transversely with respect to the direction of travel and can be as much as 40 or 50 feet wide. Typically, headers are supported on a feederhouse that has a width of 4-6 feet. The weight of the header holds it on the feederhouse.

The wider the headers are, the more sensitive they all are to forces that attempt to dislodge them from the feederhouse, such as impacts with the ground that may lift one end of the draper header up in the air.

Another problem that can dislodge a draper header from the feederhouse is a weight imbalance on one side of the feederhouse versus the other. In normal operation, this is not a serious problem. When the feederhouse is driven through a field, it harvests a swath of crop that falls on both sides of the header in equal volumes and weights. Upon occasion, however, it is anticipated that too much crop can accumulate on one side of the header, causing it to roll (i.e. rotate about a longitudinal axis extending in the direction of travel) until one end or the other contacts the ground, at which point there can be serious damage.

One particular scenario in which this can occur is when one side of the draper header becomes overloaded with crop as compared to the other side. This can happen, for example, when one of the endless belt conveyors that carry crop from the sides of the draper header into the middle begins to slip, or actually stops. If this happens, and a conveyor belt on one side of the draper header is stopped, the vehicle continues moving forward, and the reciprocating knife that extends in front of the now-stopped conveyor keeps operating to sever the crop plants from their roots.

Furthermore, the reel, which also continues operating, will push the now-cut crop plants rearward, continually adding them on top of the pile of cut crop material already piled up on the now-stopped conveyor belt.

If this cut crop material piles too deeply on the stopped conveyor belt, it can overbalance the draper header causing the draper header to tilt downward on the heavier laden side until it lifts off the feederhouse, rams into the ground, or both. This can cause serious damage to the draper header, and, even if it does not damage the draper header, can delay the farmer from harvesting as he must first manually unload the now-overburdened conveyor belt before he can attempt to started running again.

It is necessary that he first manually unload the conveyor belt, because any attempt to start the conveyor belt with a massive pile of cut crop material can cause the drive roller to slip with respect to the conveyor belt and burn the conveyor belt.

The problem may not be solved, however, merely by stopping the overloaded or slipping conveyor belt. For example if the left conveyor belt stops while it is loaded with crop, and crop continues to be conveyed by the right conveyor belt on the other side of the draper header 18 the crop arriving from the right conveyor belt jams against the stopped crop on the left conveyor belt where the two crop flows normally meet in the middle of the draper header. This jamming of a moving crop flow against a stationary, heavy layer of crop on the left conveyor prevents any crop on the right conveyor from entering the center conveyor and being carried away. As a result, the right conveyor belt continues moving, yet the crop disposed on top of the right conveyor belt piles up adjacent to the center conveyor, gradually building up on the right conveyor belt. Eventually this will overbalance the header due to the additional weight building up on the right conveyor belt. Alternatively, if the additional weight is too great, it will eventually stall the right conveyor belt, causing the right conveyor belt to slip. While the example in this paragraph speaks of the left conveyor belts stopping and the right conveyor belt continuing to move, the same is true in the opposite direction. When the right conveyor belt stops and the left conveyor belt continues to move, the same piling up of crop on the right conveyor belt can occur.

U.S. Pat. No. 5,855,108. is directed to an alarm monitor for belt slip in an agricultural combine. The belts are V-belts that transmit power between the engine and the rotor that threshes the crop. The control system compares ratios of rotor speed and engine speed to determine if slip occurs and generates an audible and a visible warning U.S. Pat. No. 4,321,991 is directed to a torque responsive interrupt for an agricultural combine that monitors a pressure signal produced by hydraulic V-belt pulleys between the engine and the threshing mechanism and declutches the drive pulley when the oil pressure reaches a threshold.

U.S. Pat. No. 7,658,059 is directed to a reciprocating knife on an auger header that separately drives left and right side reciprocating knives (called "sickles").

U.S. Pat. No. 7,669,393 is directed to a stall detection method for a lawnmower that detects a stall condition that uses a microprocessors-based controller to monitor engine speed and to declutch the rotating mower blades from the engine when the speed indicates an incipient stall condition.

The problem underlying the present invention is that of reducing or preventing the overloading of a conveyor belt on a draper header when that conveyor belt stops entirely or (alternatively) begins to slip under a too-heavy load and to prevent the overbalancing of the draper header due to crop accumulation (1) on the stalled/stopped/slipping belt or (2) on the other not-stalled/not-stopped/not-slipping belt.

SUMMARY OF THE INVENTION

The draper header has a frame that is configured to be supported on a feederhouse of an agricultural combine at a transversely central position of the draper header. The frame supports at least two endless belt conveyors, one conveyor mounted on the left side of the draper header to carry crop from its outermost end to the central location where the feederhouse is located, and another conveyor mounted on the right side of the draper header to carry crop from its outermost end to the central location where the feederhouse is located. Further, the frame supports a third endless belt conveyor, a central conveyor that conveys cut crop material received from the left side and right side endless belt conveyors rearward, through an aperture in the frame, and thence to the feederhouse for further processing by the agricultural combine.

An elongate left side reciprocating knife (also commonly called the cutterbar) is located in front of the left side conveyor to sever crop that then falls on the left side conveyor. Similarly, and elongate right side reciprocating knife is located in front of the right side conveyor for the same purpose.

A reel is supported on at least two forwardly extending arms that are pivotally coupled to the frame and are disposed at opposing lateral ends of the frame.

Each of left and right side conveyors, the left and right side reciprocating knives, and the reel are preferably driven by separate hydraulic motors that can be selectively controlled to enable or disable the elements that they drive.

The left and right side conveyors are each supported on a drive roller and an idler roller, that support and drive the endless belts of each conveyor. Each of these left and right side conveyors has an associated means for sensing whether the endless belt of that conveyor is slipping or stopping.

In one arrangement, fluctuations in hydraulic pressure supplied to the hydraulic motors driving these left and right conveyors can be monitored to determine whether a belt is becoming overloaded or slipping.

In another arrangement, rotational sensors indicating a difference in rotational speed between the drive roller and the idler roller can be used to determine whether the drive roller is slipping with respect to the endless belts of the left and right conveyors.

An electronic controller is coupled to the means for sensing and the motors driving the conveyor belts, reel, and two reciprocating knives. This electronic controller is programmed to determine whether one of the left and right conveyor belts is becoming overloaded or is slipping based at least upon signals from the means for sensing. The electronic controller is programmed to shut down an auxiliary components (for example the reel, one or both of the reciprocating knives, or the other conveyor in order to prevent the header from becoming unbalanced to the left or to the right (depending upon which conveyor is overloaded) due to accumulation of excess crop on a stopped conveyor belt.

BRIEF DESCRIPTION OF THE DRAWINGS

An embodiment example of the invention will be described with reference to the drawings, wherein.

DETAILED DESCRIPTION OF THE PREFERRED EMBODIMENTS

Figure 1:
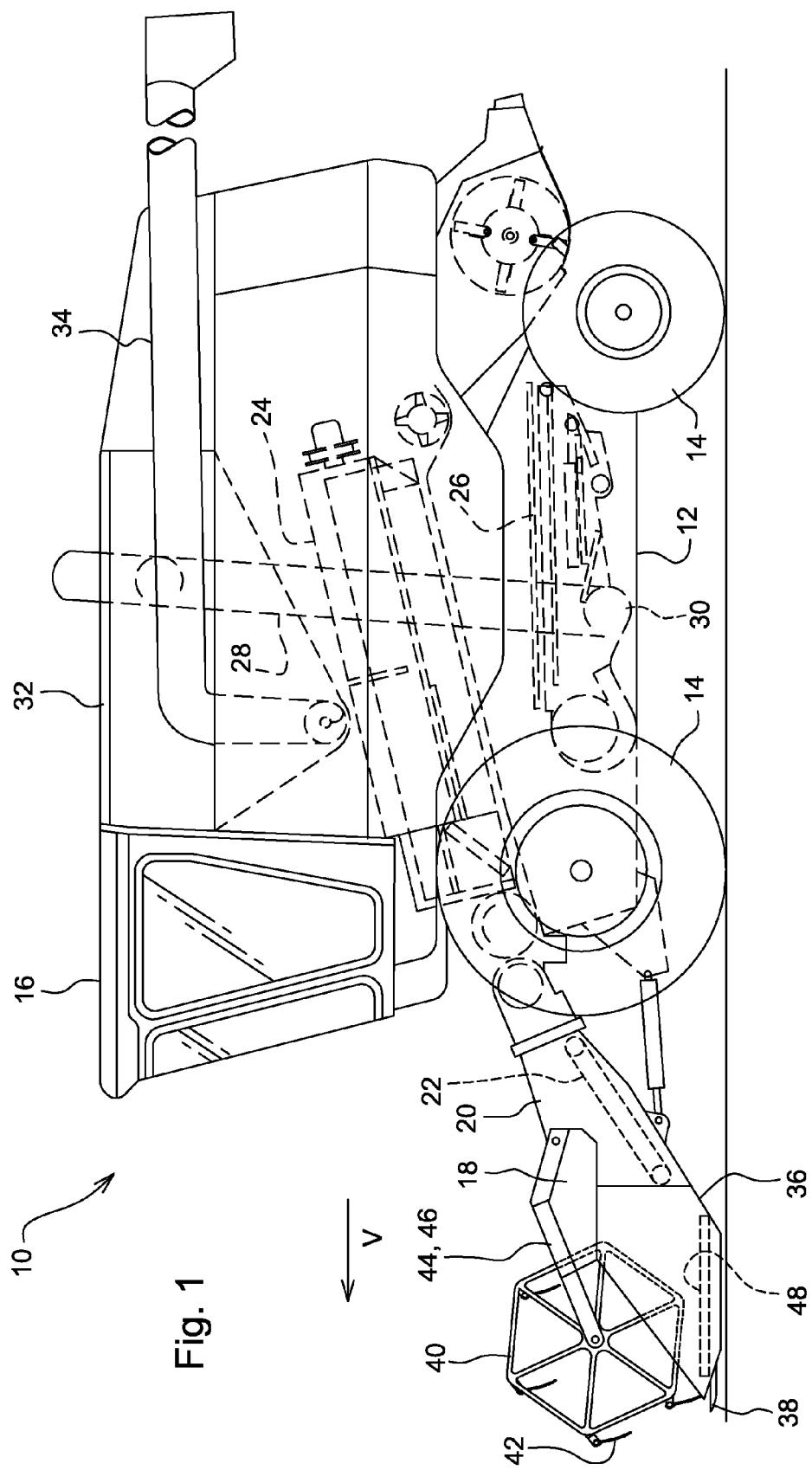
FIG. 1 shows a left side view of an agricultural combine and draper header in accordance with the present invention.

FIG. 1 shows an agricultural combine 10 with a chassis 12 with wheels 14 that engaged the ground and are mounted on chassis 12. Wheels 14 serve to propel combine 10 in the forward direction "V", which runs to the left in FIG. 1. The forward direction is the direction the agricultural combine 10 travels when harvesting. The operation of combine 10 is controlled from the operator cab 16. A draper header 18 is supported on feederhouse 20, which has a conveyor 22 disposed therein to carry crop from the draper header 18 to a thrasher and 24 disposed inside the body of agricultural combine 10. Grain falling from thresher and separator 24 passes into a cleaner 26 which includes a sieve and a chaffer that separate the grain from dust and chaff. Once cleaned in the sieve and chaffer, the clean grain is deposited in an auger conveyor 30 located at the bottom of agricultural combine 10. Auger conveyor 30 carries the clean grain to the right side of agricultural combine 10 and introduces it into a paddle conveyor 28. Paddle conveyor 28, in turn, carries the clean grain upward into grain tank 32 where it is deposited, The agricultural combine 10 is periodically unloaded through an unloading auger 34.

Draper header 18 has a frame 36 that mounts on the front end of feederhouse 20. Draper header 18 is held on the front of feederhouse 20 by its weight. A reciprocating knife 38 is disposed at a leading edge of the frame 36 to sever the stems of crop plants above their roots, causing them to fall into the draper header. Reciprocating knife 38 extends the entire width of draper header 18. A reel 40 having a plurality of elongate fingers 42 is supported on the ends of two reel support arms 44, 46 that are disposed one at each end of reel 40. Reel 40 extends substantially the entire width of draper header 18. As agricultural combine 10 is driven through the field, reciprocating knife 38 is energized severing the stems of crop plants as agricultural combine 10 pushes draper header 18 through the field. The severed crop plants fall and are directed rearwards by the elongate fingers 42 of reel 40 such that they fall onto the left, right, and center conveyors. AS long as the endless belts of the conveyors keep moving, drawing the severed crop plants toward the center of the draper header 18 and thence up feederhouse 20, there is no problem. The problem appears when one or all of the conveyors stops moving. In that case, in a matter of a few seconds a significant crop mat can accumulate on top of the conveyors by the action of reciprocating knife 38 and the reel 40. This is the problem that the present invention seeks to mitigate.

Figure 2:
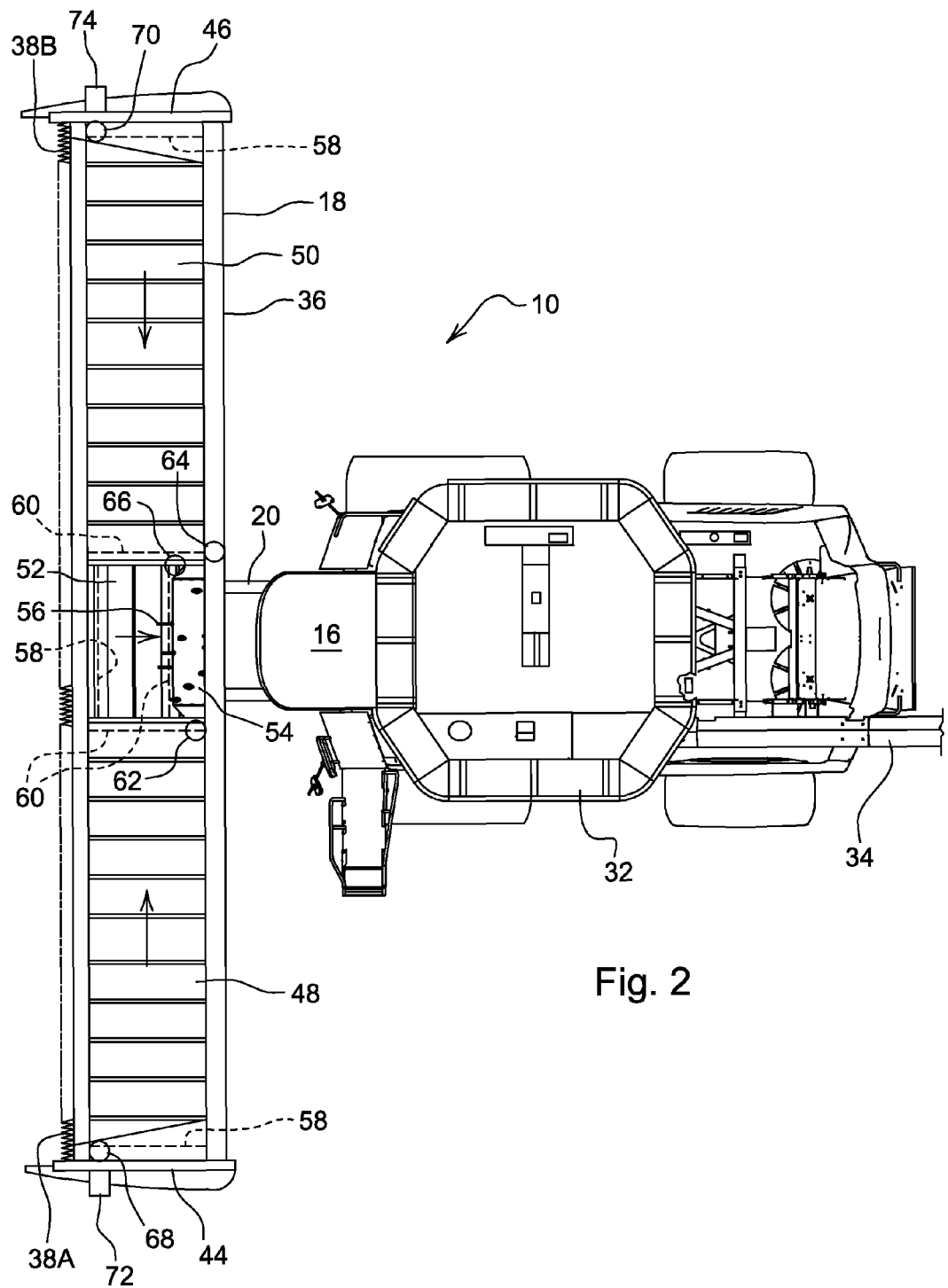
FIG. 2 shows a top view of the agricultural combine and draper header of FIG. 1 with the reel removed for clarity.

FIG. 2 shows the arrangement of conveyors and reciprocating knives of draper header 18. Draper header 18 has a left conveyor 48, a right conveyor 50, and a center conveyor 52. Each of these conveyors has an associated endless belt that conveys cut crop plants falling on its surface in the direction indicated by the arrows located on top of each of the endless belts in FIG. 2. The left and right conveyors convey the cut crop plants toward the center conveyor, which in turn conveys the cut crop plants rearward and underneath a drive roller 54, which has elongate fingers 56 extending therefrom which pull the cut crop plants underneath drive roller 54 and thence into the mouth of feederhouse 20. Once in feederhouse 20, conveyor 22 carries the cut crop plants into the agricultural combine 10 for further processing.

Each conveyor is supported on at least two rollers. These two rollers include an idler roller 58, and a drive roller 60 the idler rollers and the drive rollers are disposed inside the endless belts of each conveyor and are tensioned with respect to each other to maintain a sufficient force between the drive rollers 60 and the endless belts to ensure that the belts do not slip on the drive rollers 60. Occasionally the belts will slip, however, when the belts are overloaded or there is some contamination on the inside of the endless belt that reduces the friction between the drive rollers 60 and a belts surface.

Each conveyor is driven by its own motor. The left conveyor 48 is driven by a motor 62 which is coupled to one end of the drive roller 60 of the left conveyor. Similarly, a motor 64 is coupled to drive roller 60 of the right conveyor. Motor 66 is coupled to the drive roller of the center conveyor.

Reciprocating knife 38 can be configured as a single knife that extends completely across the width of draper header 18, or it can be configured as a plurality of knives, here shown as two knives, 38A and 38B, better independently driven by a plurality of motors, here shown as to motors 68, 70. Motors 68, 70 are fixed to the end of frame 36 of draper header 18. Motors 68, 70 are drivingly coupled to reciprocating knife sections 38A, 38B, respectively.

In FIG. 2, reel 40 has been removed for ease of viewing. The reel support arms 44, 46 are shown, however, disposed at each end of draper header 18. Each arm has an associated motor 72, 74 mounted on an end thereof and configured to drive reel 40 in rotation.

Figure 3:
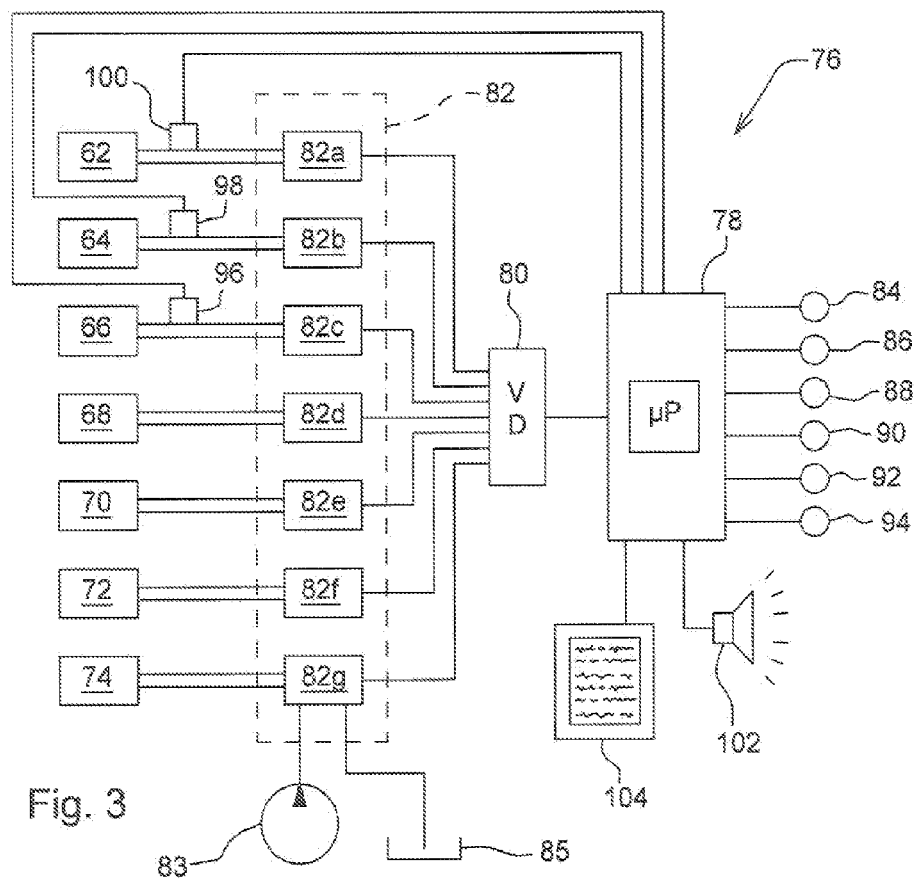
FIG. 3 shows a schematic control system diagram of the agricultural combine and draper header.

FIG. 3 discloses a control system 76 for controlling the operation of draper header 18. Control system 76 includes a microprocessor-based controller 78 which is drivingly coupled to valve driver circuits 80. Valve driver circuits 80, in turn, are coupled to a valve arrangement 82, which includes a plurality of valves 82a, 82b, 82c, 82d, 82e, 82f and 82g. A pump 83 is coupled for supplyinq pressurized fluid to the valve arrangement 82, and a sump 85 is coupled for receiving return fluid from the valve arrangement 82.

Valve 82a is coupled to motor 62 to control the flow of hydraulic fluid under pressure to motor 62. In this way, microprocessor-based controller 78 can start and stop and regulate the speed of motor 62. This is true for the other valves 82b-82g that are coupled to different motors and are controlled by microprocessor-based controller 78 to start and stop and regulate their speeds.

Microprocessor-based controller 78 is further coupled to several motion sensors 84, 86, 88, 90, 92, 94 that sense whether the belts are overloaded or slipping. Sensors 84 and 86 are coupled to idler roller 58 and drive roller 60 of the left conveyor 48, respectively. Sensors 88 and 90, are coupled to idler roller 58 and drive roller 60 of the right conveyor 50, respectively. Sensors 92 94 are coupled to idler roller 58 and drive roller 60 of center conveyor 52, respectively.

The sensors are configured to indicate whether their respective conveyors are under heavy loads or are slipping. If an endless belt is not slipping on its drive roller 60, the drive roller 60 and the idler roller 58 supporting that belt will rotate at the same relative rates (i.e. the same ratio of speeds) at all times. Once the drive roller 60 begins slipping, however, the relative rate of rotation will change. This change in the proportional rates of rotation indicates that the endless belt has begun slipping on the drive roller 60 and action should be taken.

Microprocessor-based controller 78 is programmed to continuously monitor the signals from sensors 84, 86, 88, 90, 92, and 94 during harvesting operations in the field and to determine from those sensors whether any of the three conveyor belts are slipping. Whenever it detects that a belt is slipping, it is programmed to take one or more appropriate actions, to be explained in more detail below.

There are three alternative sensors coupled to microprocessor-based controller 78 that are also configured to determine whether one of the conveyors is slipping or overloaded. These three sensors include pressure sensors 96, 98, and 100. These three pressure sensors are coupled to the three hydraulic supply lines of the three motors 62, 64, and 66. When these three motors experience an increased load on the belt, the pressure in the hydraulic supply lines will increase significantly. This increase indicates that the hydraulic motor is applying a greater torque to the belt in order to drive the belt at its optimal speed. If the pressure reaches a threshold pressure indicating imminent conveyor belt slippage or stopping, microprocessor-based controller 78 is configured to take one or more appropriate actions, to be explained in more detail below.

Whenever a belt begins to slip, and particularly when a belt is completely stalled and not moving, the operator must very quickly cure the problem, or the drive roller will begin to erase the rubber on the inside surface of the endless belt that the drive roller drives. If the situation is not remedied, the belt can be destroyed within a few tens of seconds.

The first action that microprocessor-based controller 78 is programmed to perform when it senses belt overloading or slippage, is to transmit an audible signal to the operator on annunciator 102 which is drivingly coupled to microprocessor-based controller 78 and is located in operator cab 16. This audible signal preferably has a tone that has been previously identified to the operator as an emergency tone indicating the need for instant action.

At the same time, microprocessor-based controller 78 is configured to display a visual warning message on display screen 104 to which it is drivingly coupled. Display screen 104 is also located in operator cab 16 and can be viewed by the operator when the vehicle is underway in the agricultural field harvesting crop. The visual warning message may be graphical, or it may be textual, or it may be both.

Figure 4:
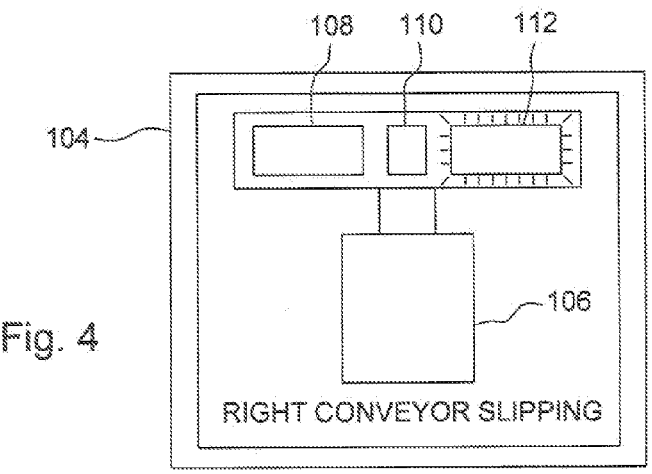
FIG. 4 shows enlarged details of the display screen upon which the control system communicates its warning messages of belt overloading or slippage.

In a preferred embodiment, shown in FIG. 4, microprocessor-based controller 78 will graphically indicate which conveyor is slipping or is overloaded by displaying a graphic of the draper header 18 and either displaying the slipping conveyor icon in a special color (such as red), or flashing the icon for the slipping conveyor on and off. In addition, the display will provide a textual explanation of the problem, in this case "RIGHT CONVEYOR SLIPPING". In the FIG. 4 embodiment, several icons are provided, including an agricultural combine icon 106, a left conveyor icon 108, a center conveyor icon 110, and a right conveyor icon 112.

Microprocessor-based controller 78 is programmed to communicate to the operator as soon as it detects that any conveyor of the three conveyors is slipping or overloaded. It is further programmed to continue this communication either with the annunciator 102, display screen 104, or both, for a predetermined period of time before taking further action. This gives the operator the opportunity to slow or stop the agricultural combine 10 to relieve the slipping and/or overloading problem before the microprocessor-based controller 78 takes further action itself. This predetermined period of time is preferably less than 10 seconds, more preferably less than 6 seconds, and even more preferably less than 5 seconds.

Once the predetermined period of time has passed, however, microprocessor-based controller 78 is then configured to take one or more additional actions to alleviate the problem and prevent the combine from being loaded with crop. This prevents the combine from being overbalanced to the left or the right, or to prevent the stalled or overloaded conveyor from being further overloaded.

In one arrangement, these additional actions include taking measures to prevent the further overloading or slippage of an overloaded or slipping conveyor belt by (1) signaling the valve 82a or 82b that controls the drive motor 62 or 64 that drives the slipping conveyor belt to stop that drive motor, thereby eliminating the risk of further belt slippage, and/or by (2) shutting off auxiliary feeder devices that would otherwise continue to feed the overloaded or slipping conveyor belt, by (a) signaling the valve 82d or 82e that controls the drive motor 68 or 70 that drives the reciprocating knife disposed in front of the slipping belt to stop that drive motor, thereby preventing the reciprocating knife from contributing to the further overloading of the slipping conveyor belt, and/or (b) signaling the valves 82f, 82g that control the drive motors 72, 74 that drive the reel 40 to stop rotating, thereby stopping reel 40 from pushing further cut crop on top of the slipping conveyor belt and further overloading it.

In another arrangement, these additional actions include actions to prevent the overbalancing of the draper header 18, by reducing the load on the conveyor that is disposed on the opposite side of the draper header 18 from the conveyor that is sensed to be slipping or overloaded. In particular, those actions include (1) signaling the valve 82a or 82b that controls the drive motor 62 or 64 of the conveyor belt opposite the sensed overloaded or slipping conveyor belt to stop that drive motor, thereby preventing the non-slipping conveyor belt from conveying additional crop, and/or (2) signaling the valve 82e or 82d that controls the drive motor 68 or 70 for the reciprocating knife (38A or 38B) that is disposed to feed the conveyor on the side of the vehicle opposite the sensed overloaded or slipping conveyor, and/or (3) signaling the valves 82f, 82g control the drive motors 72, 74 of the reel 40 to stop rotating.

In another arrangement, all of these additional actions identified above can be performed.

It should be noted that the system described herein does not require that the reel, conveyors, and reciprocating knives be independently driven and controlled. In an alternative arrangement, the systems may be driven by common drive elements such that two or more (or all) of them must be simultaneously shut down to prevent the destruction of conveyor belt or overbalancing of the draper header. Thus, as just one example, one can prevent the overbalancing of the draper header by shutting down a conveyor belt that is slipping and shutting down the non-slipping conveyor belt on the opposite side simultaneously. This can be done by shutting down two motors in the manner described above, in which each motor drives a separate conveyor belt, or as an alternative example shutting down a single motor that is drivingly coupled to both of these conveyor belts. In either event, whether a single motor or multiple motors, the result is the same: a conveyor belt that is slipping and a conveyor belt that is not slipping (and is disposed on the opposite side of the draper header 18) are shut down to prevent the draper header from being overbalanced and the slipping conveyor belt from being damaged. The same is also true regarding a common drive element for the left side and right side reciprocating knives 38A and 38B. They may also be driven by common drive element and therefore by shutting on down in front of a slipping conveyor belt, we are simultaneously shutting down the reciprocating knife in front of a non- slipping conveyor belt to prevent the header from being overbalanced. Thus, unless explicitly made a part of the claim, the claims below do not require the recited driven elements to be driven independently of each other.

In the description above, the microprocessor-based controller is shown schematically as a single rectangular shape. While this is the symbolic representation it should be understood that the microprocessor-based controller can be a single microprocessor based device or a plurality of microprocessor-based devices that each perform one or more of the actions described herein and which communicate with each other to perform all the actions in the order (if any) described herein.

The invention claimed is:

1. An agricultural combine with draper header comprising:
   an agricultural vehicle having a chassis supported on wheels to drive the chassis over the ground, the agricultural vehicle further having a feederhouse extending from a forward and thereof said feederhouse having an internal conveyor, and being configured to support a draper header thereon; and
   a draper header configured to be supported on the feederhouse and extending to the left and right of the feederhouse, the draper header further comprising,
   an elongate and laterally extending frame, said frame having a left side portion, a right side portion, and a central portion disposed to be supported on the feederhouse,
   a left conveyor disposed on the left side portion of the frame and comprising a first endless conveyor belt supported at least on a first idler roller and a first drive roller, wherein a first hydraulic drive motor is drivingly coupled to the drive roller to drive the first endless conveyor belt in a direction to convey cut crop material inward directionally toward a laterally central region of the draper header, said left conveyor extending from a leftmost end of the draper header to the a central region thereof, and
   a right conveyor disposed on the right side portion of the frame and comprising a second endless conveyor belt supported at least on a second idler roller and a second drive roller, wherein a second hydraulic drive motor is drivingly coupled to the drive roller to drive the second endless conveyor belt in a direction to convey cut crop material inward directionally toward a laterally central region of the draper header, said left conveyor extending from a leftmost end of the draper header to the a central region thereof, and
   a reciprocating knife having a left section extending in front of the left conveyor and a right section extending in front of the right conveyor; and a microprocessor-based controller configured to receive signals indicative of the overloading or slipping of a first one of the left and right conveyors and responsive to said signals to perform predetermined actions including at least shutting down the drive motor of said one conveyor when said one conveyor is overloaded or slips, wherein the agricultural harvester further comprises a visual display coupled to the microprocessor-based controller, and wherein the predetermined actions further include displaying a textual or graphical representation of belt slippage on the visual display.

2. The agricultural combine with draper header of claim 1, wherein the graphical representation includes a representation of at least the left and right conveyors.

3. An agricultural combine with draper header comprising:
   an agricultural vehicle having a chassis supported on wheels to drive the chassis over the ground, the agricultural vehicle further having a feederhouse extending from a forward and thereof said feederhouse having an internal conveyor, and being configured to support a draper header thereon; and
   a draper header configured to be supported on the feederhouse and extending to the left and right of the feederhouse, the draper header further comprising,
   an elongate and laterally extending frame, said frame having a left side portion, a right side portion, and a central portion disposed to be supported on the feederhouse,
   a left conveyor disposed on the left side portion of the frame and comprising a first endless conveyor belt supported at least on a first idler roller and a first drive roller, wherein a first drive motor is drivingly coupled to the drive roller to drive the first endless conveyor belt in a direction to convey cut crop material inward directionally toward a laterally central region of the draper header, said left conveyor extending from a leftmost end of the draper header to the central region thereof, and a right conveyor disposed on the right side portion of the frame and comprising a second endless conveyor belt supported at least on a second idler roller and a second drive roller, wherein a second drive motor is drivingly coupled to the drive roller to drive the second endless conveyor belt in a direction to convey cut crop material inward directionally toward a laterally central region of the draper header, said left conveyor extending from a leftmost end of the draper header to the central region thereof, and a reciprocating knife having a left section extending in front of the left conveyor and a right section extending in front of the right conveyor; and a microprocessor-based controller configured to receive signals indicative of the overloading or slipping of a first one of the left and right conveyors and responsive to said signals to perform predetermined actions including at least shutting down said one conveyor when said one conveyor is overloaded or slips, wherein said signals indicative of the overloading or slipping of a first one of the left and right conveyors comprises a means for sensing overpressure or slippage of at least said left conveyor and said right conveyor, said means for sensing being coupled to the microprocessor-based controller such that said microprocessor-based controller can receive said signals indicative of the overloading or slipping of one of the left and right conveyors and wherein the means for sensing is a first rotational sensor disposed to sense the rotational speed of the idler roller of the first one of the left and right conveyors and a second rotational sensor disposed to sense the rotational speed of the drive roller of the first one of the left and right conveyors, wherein the first and second rotational sensors are coupled to the microprocessor-based controller, and further wherein the microprocessor-based controller is configured to compare signals from the first and second rotational sensors and to determine whether the drive roller is slipping based upon the comparison.

4. An agricultural combine with draper header comprising:

an agricultural vehicle having a chassis supported on wheels to drive the chassis over the ground, the agricultural vehicle further having a feederhouse extending from a forward and thereof said feederhouse having an internal conveyor, and being configured to support a draper header thereon; and a draper header configured to be supported on the feederhouse and extending to the left and right of the feederhouse, the draper header further comprising, an elongate and laterally extending frame, said frame having a left side portion, a right side portion, and a central portion disposed to be supported on the feederhouse, a left conveyor disposed on the left side portion of the frame and comprising a first endless conveyor belt supported at least on a first idler roller and a first drive roller, wherein a first hydraulic drive motor is drivingly coupled to the drive roller to drive the first endless conveyor belt in a direction to convey cut crop material inward directionally toward a laterally central region of the draper header, said left conveyor extending from a leftmost end of the draper header to the a central region thereof, and a right conveyor disposed on the right side portion of the frame and comprising a second endless conveyor belt supported at least on a second idler roller and a second drive roller, wherein a second hydraulic drive motor is drivingly coupled to the drive roller to drive the second endless conveyor belt in a direction to convey cut crop material inward directionally toward a laterally central region of the draper header, said left conveyor extending from a leftmost end of the draper header to the a central region thereof, and a reciprocating knife having a left section extending in front of the left conveyor and a right section extending in front of the right conveyor; and a microprocessor-based controller configured to receive signals indicative of the overloading or slipping of a first one of the left and right conveyors and responsive to said signals to perform predetermined actions including at least shutting down the drive motor of said one conveyor when said one conveyor is overloaded or slips wherein said signals indicative of the overloading or slipping of a first one of the left and right conveyors comprises a means for sensing overpressure or slippage of at least said left conveyor and said right conveyor, said means for sensing being coupled to the microprocessor-based controller such that said microprocessor-based controller can receive said signals indicative of the overloading or slipping of one of the left and right conveyors, and wherein the first drive motor and second drive motor are each hydraulic motors, and the means for sensing is at least a pressure sensor coupled to hydraulic fluid supply lines of the motor coupled to the drive roller of said one of said left and right conveyors and being operable for generating a pressure signal, and further wherein the microprocessor-based controller is coupled for receiving said pressure signal from the pressure sensor and is configured to determine, based on a pressure signal from said pressure sensor that said one of said left and right conveyors is either overloaded or slipping.

* * * * *